United States Patent [19]
Knuppel et al.

[11] 3,864,120
[45] Feb. 4, 1975

[54] STABILIZED BURNT LIME PRODUCT AND PROCESS

[76] Inventors: Helmut Knuppel, Richard-Wagner-Strasse 1, Sulzbach-Rosenberg; Karl Brotzmann, Fentschweg 6,, Sulzbach-Rosenberg Hutte; Hans Georg Fassbinder, Schelmesgraben 20a, Sulzbach Rosenberg; Peter Wurm, Luisenstrasse 94, Dusseldorf, all of Germany

[22] Filed: July 9, 1973

[21] Appl. No.: 377,836

Related U.S. Application Data

[63] Continuation-in-part of Ser. No. 28,553, April 14, 1970.

[52] U.S. Cl. .............................. 75/5, 75/3, 75/25, 75/94
[51] Int. Cl. ............................................. C21b 1/18
[58] Field of Search .......................... 75/3, 5, 25, 94

[56] References Cited
UNITED STATES PATENTS

| | | | |
|---|---|---|---|
| 2,631,178 | 3/1953 | Morton | 75/25 X |
| 3,169,054 | 2/1965 | Werner | 75/3 |
| 3,313,617 | 4/1967 | Ban et al | 75/5 |
| 3,519,386 | 7/1970 | Fedock et al. | 75/25 UX |
| 3,547,623 | 12/1970 | Larpenteur et al. | 75/25 |
| 3,645,719 | 2/1972 | Minnick | 75/94 |
| 3,649,248 | 3/1972 | Ishimitsu et al. | 75/94 |
| 3,669,618 | 6/1972 | Cappel | 75/94 X |
| 3,721,548 | 3/1973 | Hodge et al. | 75/3 X |
| 3,793,006 | 2/1974 | Kawawa et al. | 75/3 X |

FOREIGN PATENTS OR APPLICATIONS

| | | | |
|---|---|---|---|
| 598,458 | 5/1960 | Canada | 75/3 |

*Primary Examiner*—Winston A. Douglas
*Assistant Examiner*—Thomas A. Waltz
*Attorney, Agent, or Firm*—Lawrence I. Field

[57] ABSTRACT

A stabilized burnt lime product for use in the reduction of ores in blast furnaces consists of a large proportion of free burnt lime bound together by iron oxide and other oxides to form a solid material which is slow to react with moisture or carbon dioxide in the atmosphere. The product is obtained by a sintering process in which crushed limestone is burnt to form burnt lime and this is impregnated with a fluid mixture of mixed oxides, mainly iron oxide and calcium oxide. The iron oxide is obtained by feeding with the crushed limestone to the sintering process finely divided substances containing iron.

3 Claims, No Drawings

STABILIZED BURNT LIME PRODUCT AND PROCESS

This application is a continuation in part of our U.S. Pat. application Ser. No. 28,553 filed Apr. 14, 1970.

In the reduction of ores in blast furnaces it is often necessary to add lime in the form of limestone to the charge to liquify the silica contained in the burden, particularly if the charge has not previously been prepared by sintering. As the limestone descends in the blast furnace and as it is heated more and more, it decomposes into CaO and gaseous $CO_2$. When the blast furnace is in operation, this release of $CO_2$ from the limestone in the blast furnace absorbs a considerable amount of heat, and this takes place in the furnace zone where the heat is required for reducing the ore, and if reduction is proceeding unevenly in the furnace, for melting the slag. The firing of the limestone in the blast furnace therefore has a particularly unfavorable influence on the entire blast furnace operation, resulting in a high coke consumption per ton of pig iron produced and as a consequence in a high sulphur concentration in the pig iron the sulfur being derived from the coke. As a guiding rule it may be said that each limestone addition of 200 kg per ton of pig iron produced requires an extra 60 kg of coke. A further disadvantage is that the heat is absorbed by the limestone locally, with the result that the pig iron produced is uneven in quality.

It is known to use burnt lime in the blast furnace instead of limestone in order to reduce coke consumption, but this is inconvenient because the burnt lime is rather soft and it is also necessary that it is kept free of moisture. However, the ores charged into the blast furnace are nearly always moist, owing to the fact that they are stored outdoors, exposed to the weather, and the moisture in the ore immediately reacts with the burnt lime to form calcium hydroxide ($Ca(OH)_2$). The resulting $Ca(OH)_2$ is mainly in powdered form and clogs the burden column in the furnace, so that the furnace gases have difficulty in ascending. Also the $Ca(OH)_2$ reacts easily with the $CO_2$ present in the furnace to form $CaCO_3$, i.e. limestone, the very substance one is trying to replace. Hence the use of burnt lime in place of limestone is not widely practiced. It is also known to supply a sintered ore charge to the blast furnace, in which case it is usually the practice to supply as nearly as possible all the lime required for slag formation in the form of limestone ($CaCO_3$) added to the material which is charged to the sintering machine, so that the driving off of the $CO_2$ from the limestone takes place in the sintering machine rather than in the blast furnace. This produces a sintered product in which the calcium is entirely in the form of other oxides, for example $CaSiO_3$, this substance leaving the blast furnace unchanged in the slag. Alternatively, the calcium in the sintered product may be in the form of calcium ferrite, which must be decomposed in the blast furnace to form free lime before the CaO can react to form $CaSiO_3$. In another known sintering process the sintered product is called a dicalcium ferrite sinter and contains approximately 40% CaO, 6% $SiO_2$ and 45% iron oxide. In this sinter the calcium is largely in the form of complex oxides, which are formed during the sintering process with the production of large amounts of heat which is not available to the blast furnace operation.

The principal object of the present invention is to provide a process for making a stabilized burnt lime which is slow to react with moisture or carbon dioxide in the atmosphere and is for use in the reduction of ores in blast furnaces.

It is a further object of this invention that the stabilized burnt lime should contain as high a concentration as possible of free lime, so that the large amount of heat released in the formation of further compounds such as calcium silicate is made available in the blast furnace itself, rather than in the sintering machine, the heat being released in the lower part of the blast furnace so that a saving in coke is obtained.

It is yet another object to prepare the burnt lime and to impregnate the burnt lime in one operation. This provides for an economic process, and for this process limestone is burnt in a sintering process which will be described in greater detail further below, together with material containing iron oxide, preferably one of the following materials which contain a high concentration of iron: iron ore, rolling mill scale, blast furnace flue dust and iron turnings. $CO_2$ is driven off from the limestone to form burnt lime, and the resulting lime together with iron oxide forms a low melting point easily flowing phase, which fills up the pores of the burnt lime to form a solid sinter cake.

Instead of supplying separate quantities of limestone and iron containing materials, it may be possible to use materials which already contain the necessary ingredients in the form of impurities, provided that the resulting sintered burnt lime has the desired properties. For example, a low-iron, high-carbonate ore containing 65% $CaCO_3$, 17% $Fe_2O_3$ and 10% $SiO_2$ can be burnt on a sintering machine, the product being charged to the blast furnace as described above.

The preparation of the stabilized sintered lime in accordance with the invention provides a number of advantages, compared to the sintering of iron ores. The limestone need be crushed only down to a comparatively large grain size, for example, 4 mm. This saves crushing costs, compared with the customary ore sintering process in which the limestone is usually crushed down to a grain size less than 2 mm. This coarse crushing usually produces less than 10% of limestone fines of grain size less than 0.1 mm, allowing gases to pass easily through the material on the sinter bed and so promoting even burning during the preliminary sintering operation.

The desired results are also favored by using a relatively long ignition period of 90 seconds and a relatively high ignition temperature of approximately 1,300°C during the sintering operation. These sintering conditions produce a very good sintered lime even in the upper part of the layer of material on the sinter belt, and favor an even burning. Assuming use of approximately 9% of coke, based on the limestone fraction, and assuming operating conditions as described above, the fraction of material which has to be recycled is approximately the same as the fraction of recycle material required by the process according to the invention in the feed to the sintering machine. The weight % of recycled material preferably amounts to approximately 50% by weight although as little as about 25% by weight of recycled material can be used. This fraction is higher than that needed in the customary sintering process, in order to prevent excessive cracking of the sinter cake with resulting loss of volume, and to ensure an even burning. A further advantage is that the layer of material on the sinter belt is highly permeable to air. This allows a thicker layer to be used, and less underpressure. Consequently a higher output is obtained from the sintering machine, in spite of the higher consumption of heat and air.

Tests have shown that the easiest sintered product to make contains only between one-fifth and one-third as much iron oxide as lime. If too much iron oxide is used the larger particles of the crushed lime remain in the sinter cake in the form of white grains which have not been impregnated. A sintered product of this kind is quickly damaged by moisture in the air. It is therefore essential to arrange the starting materials so that the ratio of calcium oxide to iron oxide in the finished sinter cake is more than 2, the best value being between 3 and 5.

In order to obtain a high permeability to air in the layer of material on the sinter belt, the charge fed to the sintering machine is moistened to a moisture content between 8 and 10% and is then fed, preferably without intermediate storage so as to avoid possible hydration of the recycle material straight on to the sinter belt. Intermediate storage would quickly dry out the material, by a partial hydration of the unimpregnated fraction which is always present in the recycle material. An excessively dry charge does not sinter so well in the sintering machine.

By way of a non-limiting example, there will now be described in greater detail the preparation of a burnt lime stabilized in accordance with the invention on a sinter belt, and its application in a blast furnace.

The feed material for the sintering machine contained the following, all parts being by weight:

100 parts crushed limestone in pieces smaller than 4 mm
30 parts blast furnace flue dust
10 parts coke fines
50 parts recycle material.

The blast furnace flue dust contained:
34% iron,
14% $SiO_2$,
8% CaO,
20% volatiles, and
the remainder comprising various other metal oxides.

The coke had a grain size less than 5 mm, and contained:
8% water,
14% ash, and
the remainder was carbon.

This feed material for the sintering machine was mixed dry and then moistened in a drum to contain approximately 8% water. Immediately after moistening, the material was fed, without intermediate storage, to the travelling grate of the sintering machine. The layer of material on the sinter belt had a thickness of 40 cm. The material was fired at 1,300°C for 90 seconds. A suction of 500 mm water gauge was maintained in the suction box. The material took 12 minutes to pass through the suction section. The finished sinter cake had the composition:
65% CaO,
17% $Fe_2O_3$,
10% $SiO_2$, and
a remainder consisting of other metal oxides.

This sintered product was hard and resistant to impact. It withstood 4 weeks of storage in normally moist air, without any noticeable loss of mechanical strength.

A blast furnace test was made using this sintered material, the test lasting for 4 weeks. The charge fed to the blast furnace was normal, except in that the limestone fraction of 250 kg per ton of finished pig iron was replaced by a stoichiometrically equivalent quantity of the stabilized burnt lime sinter. Coke consumption in the blast furnace was decreased from 615 to 515 kg per ton of pig iron produced.

The output from the blast furnace was increased by 15% due to the lower coke consumption, and the concentration of sulphur in the pig iron was less by 20%, compared with what had been obtainable by previously using limestone in the charge.

We claim:

1. A process for preparing a hydration-resistant lime sinter for use in the reduction of ores in blast furnaces, which comprises:
   a. crushing limestone to a particle size of less than 4 mm, and
   b. forming a bed of a sinterable mixture which includes said crushed limestone and (1) ferruginous material, the quantities of said material and of the limestone being proportioned so that in the sintered material the ratio by weight of calcium oxide to iron oxide as $Fe_2O_3$ lies between 3 and 5, (2) coke and/or coal with low gas content and (3) recycled sintered material,
   c. moistening the resulting mixture to a water content between 8% and 10% by weight before sintering,
   d. igniting said bed for a brief interval of time of about 90 seconds at about 1300°C, and
   e. then sintering the mixture of said bed thereby producing a porous burnt lime and simultaneously therewith impregnating said burnt lime with a fluid mixture of calcium oxide and iron oxide.

2. A process as in claim 1, wherein the amount of recycled material in the sinter mix prior to the sintering amounts to approximately 50%.

3. A process as in claim 1, wherein the ferruginous material is selected from the group consisting of iron ore, rolling mill scale, blast furnace flue dust and iron turnings.

* * * * *